United States Patent
Robbins

(10) Patent No.: US 6,866,427 B2
(45) Date of Patent: Mar. 15, 2005

(54) FIBER OPTIC LED LIGHT

(75) Inventor: Paul E. Robbins, Mission Viejo, CA (US)

(73) Assignee: Lumenyte International Corporation, Foothill Ranch, CA (US)

( * ) Notice: Subject to any disclaimer, the term of this patent is extended or adjusted under 35 U.S.C. 154(b) by 43 days.

(21) Appl. No.: 10/293,026

(22) Filed: Nov. 13, 2002

(65) Prior Publication Data

US 2003/0091820 A1 May 15, 2003

Related U.S. Application Data

(60) Provisional application No. 60/350,675, filed on Nov. 13, 2001.

(51) Int. Cl.[7] ................................................. G02B 6/32
(52) U.S. Cl. ........................................... 385/88; 385/92
(58) Field of Search ............................... 385/53, 55, 58, 385/60, 66, 76, 78, 88, 92, 77

(56) References Cited

U.S. PATENT DOCUMENTS

| | | | | |
|---|---|---|---|---|
| 4,118,105 A | * | 10/1978 | Voigt ............................. | 385/88 |
| 4,737,011 A | * | 4/1988 | Iri et al. ......................... | 385/78 |
| 5,271,079 A | * | 12/1993 | Levinson ....................... | 385/46 |
| 5,283,850 A | * | 2/1994 | Souloumiac ................... | 385/84 |
| 5,313,540 A | * | 5/1994 | Ueda et al. .................... | 385/78 |
| 5,329,541 A | * | 7/1994 | Brown .......................... | 372/88 |
| RE34,790 E | * | 11/1994 | Musk ............................. | 385/93 |
| 5,661,834 A | * | 8/1997 | Watanabe et al. .............. | 385/92 |
| 5,838,857 A | * | 11/1998 | Niekrasz ....................... | 385/56 |
| 5,913,002 A | * | 6/1999 | Jiang ............................. | 385/88 |
| 6,061,493 A | * | 5/2000 | Gilliland et al. .............. | 385/140 |
| 6,062,739 A | * | 5/2000 | Blake et al. ................... | 385/76 |
| 6,139,194 A | * | 10/2000 | Bella et al. .................... | 385/73 |
| 6,179,480 B1 | * | 1/2001 | Bella et al. .................... | 385/76 |
| 6,318,909 B1 | * | 11/2001 | Giboney et al. .............. | 385/90 |
| 6,599,026 B1 | * | 7/2003 | Fahrnbauer et al. .......... | 385/77 |

* cited by examiner

Primary Examiner—Dean A. Reichard
Assistant Examiner—Adolfo Nino
(74) Attorney, Agent, or Firm—Brian F. Drazich

(57) ABSTRACT

An LED coupled to a large core plastic optical fiber light guide with a tubular connector having a first bore into which the light guide is inserted, a second bore into which the LED and its attached wires are inserted and a third bore adjacent to the first bore, extending between the first and second bores and into which the LED is positioned so that when illuminated the LED transmits light into the guide with the first bore. The connector includes helical threads formed in the first bore into which the guide is threaded to securely retain the guide within the first bore and which form a seal to prevent contaminants from entering the region in the first bore adjacent the LED. Alternatively, the connector includes one or more internal channels extruding around the inner periphery of the bore and into which one or more O-rings are positioned so that the guide is securely retained within the first bore and that a barrier is formed to prevent contaminants from entering the region in the first bore adjacent the LED.

It is emphasized that this abstract is provided to comply with the rules requiring an abstract that will allow a searcher or other reader to quickly ascertain the subject matter of the technical disclosure. It is submitted with the understanding that it will not be used to interpret or limit the scope of the claims.

22 Claims, 2 Drawing Sheets

FIBER OPTIC LED LIGHT

CROSS REFERENCE TO RELATED APPLICATIONS

This application claims the benefit of U.S. Provisional Application Ser. No. 60/350,675, filed Nov. 13, 2001, which is incorporated herein by reference.

TECHNICAL FIELD

The present invention relates to improvements in the field of fiber optic lighting in which the light source is one or more light emitting diodes (LED) that in turn are connected to a source of electrical power, a light guide or light guides, such as for example, large core plastic fiber optical conduit, as well as acrylic rods, with a connector into which the light guide and LED are placed so that the LED light source is connected to the light guide.

BACKGROUND ART

In the field of large core plastic fiber optical conduit technology light in the visible spectrum is transmitted along a light transmitting form or guide that includes at least a light transmitting core and a cladding. This form is also typically referred to as a fiber optic, conduit, light guide, light form, or simply as an "optic". The transmitted light may, in some applications, be emitted out one end of the optic (end lit applications), or in other applications, be emitted radially outward, (side lit applications) or both. The core is typically made of a polymeric material, and the cladding typically is made of a fluoropolymer material, for example that sold under the Teflon brand. In some applications the clad core is surrounded with a finish jacket, also typically made of a polymeric material. These types of fiber optics are described in U.S. Pat. Nos. 5,298,327; 5,221,381; and RE No. 36,157, all of which are incorporated by reference herein. In addition to large core fiber optic technology, cladded plastic rods and other linear light forms or conduit that use an external light source are well known and are used to provide functional as well as decorative lighting.

Conventional light guide lighting system technology includes a source of illumination and placement of a light guide in close proximity to the output end of the light source. Common light sources include various types of light emitting devices, such as quartz halogen and metal Halide devices. Recent advances in LED technology have enabled light guide lighting systems to use the light output from one or more LED's as a light source. However, the structures by which the LED, or LED's are connected to the light guides have been inadequate. By way of example, the inadequacies include lack of secure retention of the light guide to the light source, lack of water resistance at the point of connection, poor dissipation of heat generated by the light source and difficulty with removal and replacement of the LED light source. The present invention is directed to solving these problems.

DISCLOSURE OF INVENTION

With reference to the above-identified inadequacies in conventional structures that connect a light guide to a LED lighting source, the present invention, in its many embodiments, serves to reduce, minimize and/or essentially eliminate the aforementioned inadequacies. To this end, various embodiments of the present invention include a substantially tubular container, having preferably, three bores and which form a connector. One or more LED's are placed in one bore, wiring is placed in the second bore and the light guide is placed in the third bore. Material of construction is preferably metal, with relatively hard, durable plastic materials also being useful. The LED's are typically placed inside in a unidirectional orientation, and are connected to the source of electrical energy.

In one aspect of the invention, the optical conduit is inserted into a threaded bore or cavity at one end of the connector. The threads inside the bore tap or form complementary intermeshing threads in the softer outer circumferential surface of the optical fiber, or bundle of fibers, as the connector is twisted or screwed onto one end of the light guide, thereby providing a secure union between the light conduit and the connector, as well as providing a seal against penetration of gas, liquid or small solid particulates into the region of the LED positioned within the connector. Preferably, to enhance the security of the union and the seal, the threaded bore or cavity is slightly tapered so as to narrow slightly along its length from its opening at one end of the connector extending toward the middle of the connector.

Alternatively, in another aspect of the invention, one or more "O" rings made of a flexible material, suitable for the particular environmental use of a specific fiber optic, are inserted into recesses positioned in the connector bore in which the fiber optic is to be inserted. The O-ring functions to provide a liquid or gas resistant seal, and also functions to assist in securely retaining the light guide within the connector. The outer diameter of the O-ring, or rings, is slightly larger than the interior diameter of the connector, thereby permitting it to be fitted into a recess, or channel on the interior of the connector. Also, the inside diameter of the O-ring, or rings is preferably slightly less than the outer diameter of the light guide, or bundle of light guides, thereby providing for securely gripping the light guide, or light guides, as well as providing a barrier resistant to penetration of any solid (such as very small particulate matter), liquid or gas that contacts the O-rings or ring. Thus, the chamber or bore within which the LED or LED's is placed, remains free of contaminants.

The light guide or light guides are placed in close proximity to the chamber in which the LED or LED's are positioned so that the light emitted from the LED or LED's is transmitted into the light guide or guides with a relatively high efficiency. While the preferred configuration of the connector component of the present invention is tubular, it need not be tubular, but can be of other geometric shapes, such as triangular, rectangular, oval, and so forth, which other shapes are considered to be equivalent for the purposes of the present invention. Furthermore, although the connector structural components of the present invention is sized to fit commercially available sizes of fiber optic light guides, the structures of the present invention may be larger, smaller and/or of different proportions to accommodate the requirements of specific end use applications, and all such sizes are considered to be equivalent for purposes of the present invention.

The electrical structures of the present invention also may be of various physical sizes and of various electrical capacities, such as to accommodate various voltage and current requirements, by using conventional resistors, wires and power sources. Typically, the resistor(s) is/are placed within the connector unit and potted, in a conventional fashion to protect the circuitry from damage and to help retain the LED. The choice of the value of the particular resistor(s) is within the skill of a person of ordinary skill in this field, with the resistor value chosen to convert the voltage from that of the input power supply, to the voltage at which the particular LED(s) is/are designed to operate. Wiring and power supply technology for use with LED lighting systems is well known. The structures used in the present invention can be adapted for specific resistors and other specific electrical components within the system in a conventional fashion, to accommodate a particular end use application.

BEST MODE FOR CARRYING OUT THE INVENTION

Figure 1:
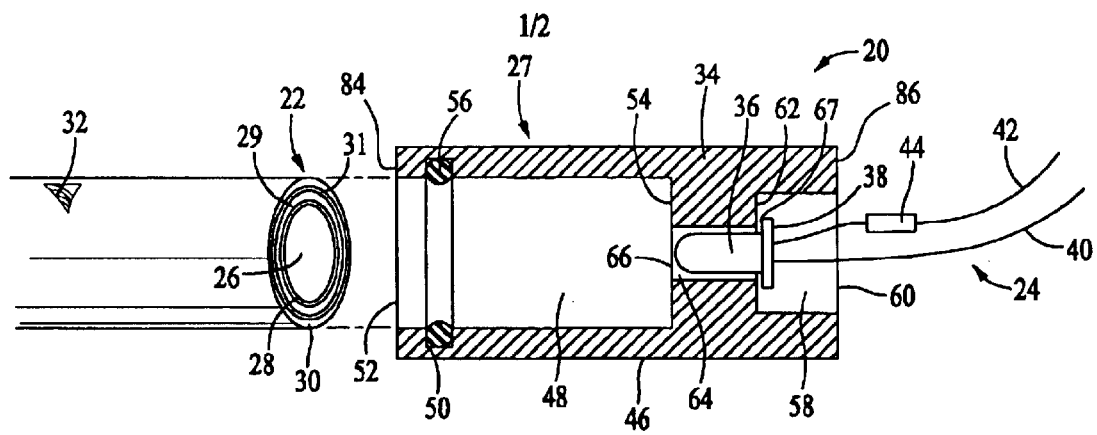
FIG. 1 is a cross-sectional view of a first embodiment of the present invention.

With reference to FIGS. 1–5, embodiments of the invention will be described.

One embodiment 20 of the fiber optic LED light system includes a large core plastic fiber optical conduit 22, an LED light source 24 and a connector 27 positioned there between and which functions to connect the fiber optic 22 to the LED light source 24.

While various sizes and types of light guides may be employed in the present invention, a notched, five component fiber optic light guide is shown for use in the first embodiment. The light guide is a conventional large core plastic fiber optical conduit available from Lumenyte, International Corporation, and includes a light transmitting core 26, a clad 28, a white jacket 29, preferably of a vinyl material, a black jacket 31, also preferably of a vinyl material, a finished jacket 30, which extends over the notches, and notches 32, placed along the length of the fiber optic 22, all of which are conventional.

The LED light source 24 includes a conventional LED 36 having a base 38, lead or wire 40 and lead or wire 42. Leads 40 and 42, respectively, are connected at one end to the LED, and at the other end to a power supply, not shown. Resister 44 is connected in line 42 in a conventional fashion. Typically, the power supply operates at a voltage that is different from the pre-determined operating voltage of the LED 36. Accordingly, the value of the resister 44 is chosen to convert the voltage of the power supply to the pre-determined operating voltage of the LED 36, according to well-known basic principles of electric circuitry.

The connector 46 in the FIGS. 1–5 embodiments is generally of a cylindrical or tubular shape and in which three cavities or bores are provided, with each of the bores having a different diameter. The connector is preferably made of metal, as shown at 34, such as aluminum, but may be made of other materials such as relatively hard, durable plastics such as ABS, PVC, polycarbonate or other polymeric materials, or of a combination of such materials. The connector 46 includes a bore or chamber 48, located at a first end having a first end surface 84, and which is sized and adapted for receiving the fiber optic 22. The bore or chamber 48 may either have an essentially uniform first diameter, or have a diameter which decreases along its length from the open end 52 of the connector 46 toward the midsection of the connector, depending upon the manner chosen for securing the optical conduit and connector together. The fiber optic 22 is inserted through the open, first end 52 of the bore and extends up to and against the second end of the cavity 48 at wall 54.

In a first embodiment, a channel 50 is provided in the wall of the tube 46 near the first end 52, as shown in FIG. 1. The channel 50 extends circumferentially and has an outer diameter slightly greater than the outer diameter of the cavity 48. The channel 50 is sized and adapted to receive a conventional O-ring 56, as shown in FIG. 1. The O-ring 56 is conventional, and its material of manufacture is selected to accommodate the environment of use of the LED fiber optic light 20, as well as to provide the resilient, sealing function of an O-ring. The O-ring 56 is also, preferably, chosen to have an outer diameter slightly greater than the outer diameter of the channel 50. The O-ring 56 is also chosen to have an inner diameter slightly less than the inner diameter of the chamber 48, as well as slightly less than the outer diameter of the fiber optic light guide 22. Choice of each specific diameter is made in accordance with known principles, and is chosen so as to provide for a secure fit of the light guide 22 within the chamber 48, as well as to provide for maintaining a barrier between that portion of the chamber 48 interior to the O-ring and that part of the chamber 48 on the side of opening 52.

Connector 27 also includes, a second bore or cavity 58, located at its opposite or second end having a second end surface 86. Cavity 58 is sized and adapted to receive LED 36 and the associated electrical components including wires 40 and 42, and resistor 44. Typically, the diameter of the cavity 58 would be smaller than the diameter of cavity 48, and, typically, the length of cavity 58 would also be less than the length of cavity 48, although different lengths for these structures will still provide for useful LED fiber optic light and connector assemblies. The cavity 58 includes a first, open-end 60 into which the LED, wire and resistor assembly is inserted. The cavity 58 also includes a wall 62 at its opposite, internal end. The wall 62 also functions as a stop, or abutment surface, for the base 67 of the LED 36.

Bore 64 extends through the center of the tube or cylinder 46, and at one end opens into cavity 58 and at its opposite end 66, opens into cavity 48 of the tube 46. The cavity 64 is sized, preferably, to be approximately the length of the LED 36, and to be slightly greater in diameter than the diameter of the LED 36, as shown in FIG. 1. Thus, when assembled, the present invention provides for the LED 36 being positioned closely adjacent to the end of the fiber optic light guide 22.

Figure 2:
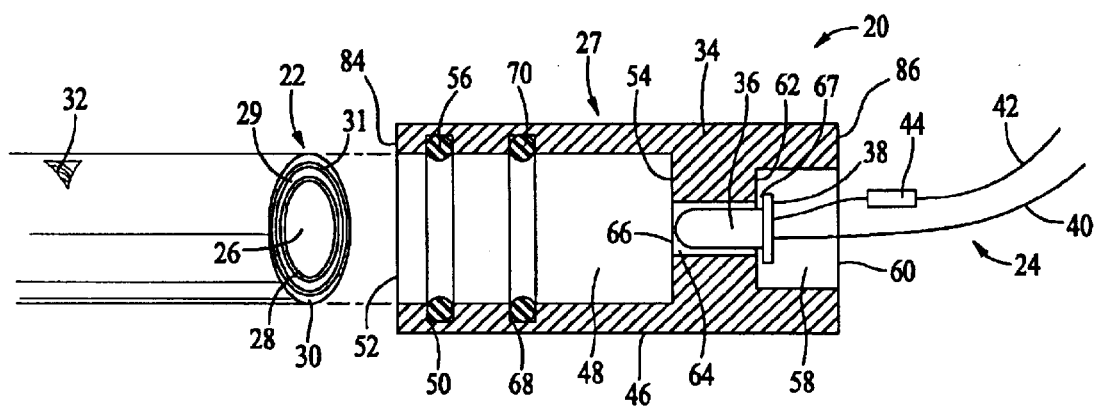
FIG. 2 is a cross-sectional view of a second embodiment of the present invention.

With reference to FIG. 2, the second embodiment of the present invention includes a light guide, LED light source and tubular connector as shown in FIG. 1, with like components bearing like reference numerals, and, additionally, a second O-ring channel and second O-ring. Thus, a second channel 68 is shown in FIG. 2, having the same structural features as first channel 50, except that second channel 68 is positioned adjacent to and closer to end 54 of cavity 48 than is the first O-ring channel 50. Second O-ring channel 68 is also shown with O-ring 70 in place. The second, or double O-ring structure of the FIG. 2 embodiment provides for an increased degree of securing or retaining the light guide 22 within the cavity 48, as well as providing for an increased strength barrier between the outside environment of use and the inner region chamber or cavity 48, i.e., that region near the LED 36.

Figure 3:
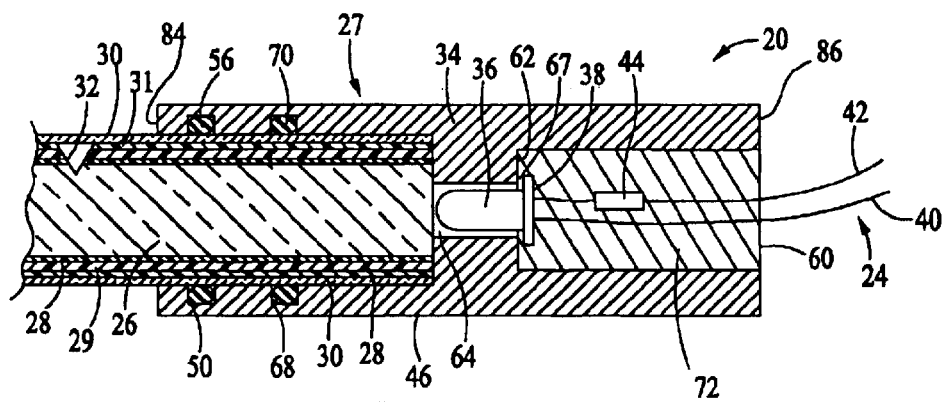
FIG. 3 is a cross-sectional view of the FIG. 2 embodiment, as assembled.

FIG. 3 illustrates an assembled fiber optic LED lighting system of the second embodiment. In FIG. 3, like reference numerals are used for like components, as shown in the FIG. 2 embodiment, with the exception that the chamber 72 in the FIG. 3 embodiment is shown to have a greater length than the corresponding chamber 58 in FIG. 3. As discussed above, the particular length of the chamber 58 can be varied in accordance with the specific end-use application requirements. In one option, the resistor 44 may be positioned inside of the chamber 72, as shown in FIG. 3. The wires 40 and 42 as well as the resistor 44 are surrounded by conventional potting compound, which functions to retain the LED, wires and resister in place within the cavity 72. In another variation of the invention, the resistor may be located remotely from the chamber 72, in which case the chamber could be of a smaller size. In use, the LED 36 is butted up against the wall 62 at the LED's base 67 and then is retained in place by potting compound, as shown in FIG. 3.

Figure 4:
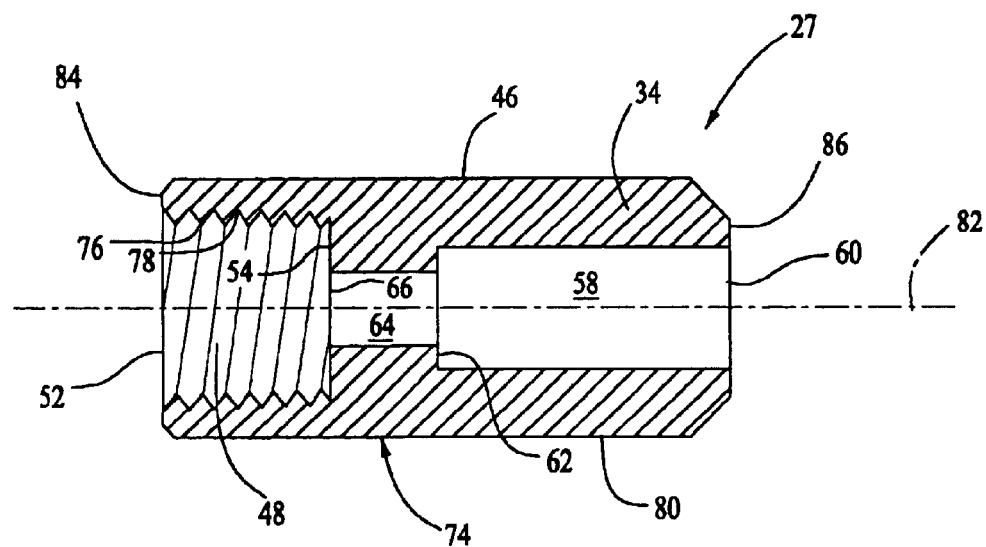
FIG. 4 is a cross-sectional view of a third embodiment of the present invention.
Figure 5:
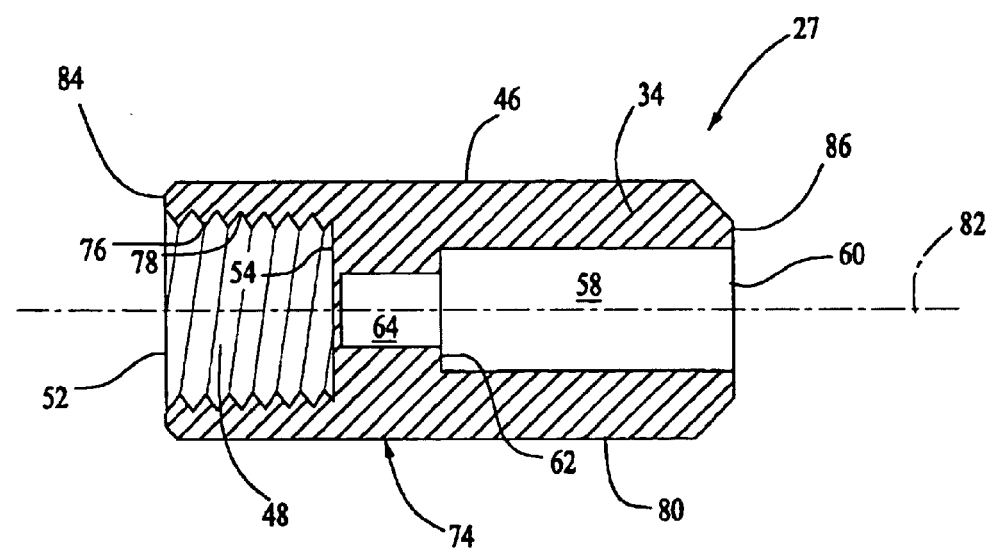
FIG. 5 is a cross-sectional view of an alternative third embodiment of the present invention.

FIGS. 4 and 5 illustrate a third embodiment of the connector 27. Shown for example in FIG. 4 is longitudinal axis 82, which is common to all embodiments. In FIGS. 4 and 5, like reference numerals are used for like components, as shown in the FIG. 3 embodiment. In this third embodiment, bore or cavity 48 has a diameter which decreases slightly from opening 52 along the length of the bore toward wall 54, to form a tapered circumferential wall 76. The tapered circumferential wall 76 together with wall 54 and the plane formed by opening 52 enclose a truncated conical volume. The truncated conical volume thus formed, has an essentially circular cross-section which is orthogonal to the longitudinal axis 82. Helical threads 78 are formed in tapered circumferential wall 76 and extend substantially along circumferential wall 76 from opening 52 toward end wall 54. The axis of the helix defining the helical threads is parallel with the longitudinal axis 82 of the connector 46. A knurled or roughened band 74 extends circumferentially around the outer surface 80 of connector 27 to facilitate gripping or grasping in installing the connector onto a light guide. In this third embodiment, the connector 27 is installed onto an optical conduit or fiber optic bundle by inserting the light guide into opening 52 and screwing the connector 27 onto the end of the conduit until the end of the conduit is proximate end wall 54 of bore 48.

Any large core plastic optical conduit having a core diameter of ⅜ths of an inch or greater, or a bundle of small core fiber optics, i.e., whose individual fibers have a core of less than ⅜ths of an inch diameter, can be used in the present invention. They can be connected to, and will function to transmit light from inside the connector through and along the length of the fiber optic. Additionally, solid light guides, such as acrylic rods, as are well known, may be used. Light guides that are jacketed with a finished jacketing material, such as PVC, are preferable to those that are not so jacketed. Lumenyte International Corporation's large core plastic fiber optic products sold as "SB 255" "SB 300" and "LEF" fiber optics are preferable for use with the present invention for the reason that they are jacketed and the jacketing material is a finished jacket with non-rigid material.

In use, the present invention may be connected to each end of a length of a single, large core plastic fiber optical conduit, or to a bundle of small core fiber optics to thereby provide additional lighting. A series of these light guides may be placed end-to-end over long distances, in which the length is limited only by the electrical constraints of the system.

EXAMPLE 1

In a first example, a connector 27 was made by machining a solid, cylindrical aluminum bar, having an outer diameter of 0.565 inches, and a length of 0.800 inches into the shape shown and described in FIG. 1. The size of the opening 52, for insertion of the large core fiber optic, was machined to be the same size as that of the outer diameter of Lumenyte, International Corporation large core plastic fiber optical conduit, sold as "SB 255." An LED obtained from DuraLed, located at Irvine, Calif. was used and connected to a 13.8 volt DC power source. In order to match the voltage requirement of the LED with the power source, a 440-ohm resistor was connected as illustrated in FIG. 1. The LED wire was potted with a thermally conductive, but electrically of nonconductive material. The potting material was a silicone based, conventional potting material obtained from R.S. Hughes Company, Santa Ana, Calif. The single O-ring was made of BUNA-N, and purchased from McMaster Carr, located in Santa Fe Springs, Calif., as its part number 9452K21. The O-ring had a 0.500 inch outer diameter and a 0.375 inch inner diameter, and was inserted into the connector channel, or indent 50 as shown in FIG. 1. The fiber optic 22 was then inserted into the connector up to and abutting against the machined stop at end 54 on the interior of the connector in chamber 48. The connector unit functioned both as a connector as an illuminator. When energized, power was transmitted to the LED, causing it to illuminate, and transmit light into the SB 255 fiber optic. The fiber optic 22 was usefully retained within the chamber 48, and the aluminum connector/illuminator structure functioned as a heat sink as well.

EXAMPLE 2

In a second example, a second solid cylindrical aluminum bar was machined into a connector, as shown in FIG. 1, except that two indents, or O-ring channels were machined into the bar, as illustrated in FIG. 2. All components of the Example 2 embodiment were the same as described above with respect to Example 1, except for the double O-ring structure and that the LED assembly was not potted into chamber 58. The fiber optic 22 was inserted into the chamber 48, butted up against end wall 54 and thereafter pulled and manipulated to determine its relative stability. When pulled and so manipulated, the light guide 22 was substantially more firmly secured within the cavity 48 than was the light guide secured by the single O-ring structure of Example 1. The double O-ring configuration of the present invention is preferable compared to the single O-ring embodiment.

EXAMPLE 3

In a third example, a hot bonding material, obtained from R.S. Hughes Company was used as the potting material. The hot melt bonding material, Hughes part number 3747PG is sold as its "3M Jet-Melt™" bonding material. While both the silicon as well as the hot melt bonding material were useful for the present invention, the preferred potting material is the hot melt bonding material sold as "3M Jet-Melt".

EXAMPLES 4, 5, AND 6

As Examples 4, 5, and 6, ABS, PVC and polycarbonate plastic materials are believed to be useful in the construction of the connector used in the present invention. This belief is based on well known properties for those materials in that they possess sufficient structural rigidity to function as a supporting connector, have the ability to dissipate heat sufficiently, and can be manufactured into appropriate shapes in a cost-effective manner.

EXAMPLE 7

In a seventh example, an assembled sample of the invention, as described and illustrated as the FIG. 3 embodiment, was tested by placing it under 12 inches of water for a period of 24 hours. The purpose of the test was to determine the degree of water resistance exhibited by the FIG. 3 embodiment O-ring structure. After 24 hours, there was no leakage of water into the interior of the unit. The double O-ring design worked for the intended purpose of providing a barrier between the outer environment and the inside of the cavity adjacent to the LED.

EXAMPLE 8

In an eighth example, a connector 27 was made by machining a solid, cylindrical aluminum bar, having an outer diameter of 0.565 inches, and a length of 1.500 inches into the shape shown and described in FIG. 4. Cavity 48 was machined to have a diameter of 0.455 inches at opening 52, which tapered to a diameter of 0.425 inches at the junction of the cavity with end wall 54. The tapered cavity or bore 48 was then threaded along a substantial portion of its length, and an optical conduit having an outside diameter slightly greater than 0.455 inches was screwed into the cavity 48 until the end of the conduit abutted the end wall 54. The FIG. 4 embodiment, as described and having an LED assembly potted with "3M Jet-Melt™" bonding material, was tested by placing it under 12 inches of water for a period of 24 hours. The purpose of the test was to determine the degree of water resistance exhibited by the FIG. 4 embodiment having a tapered and threaded cavity for joining to the optical conduit. After 24 hours, there was no leakage of water into the interior of the unit. The tapered and threaded cavity design worked for the intended purpose of providing a seal between the outer environment and the inside of the cavity 48 adjacent to the LED.

In yet another alternative embodiment cavities/chambers/bores 48, 58, 64 are not in continuous fluid communication and do not form a continuous open bore or tunnel from one end of the connector to the other. In this embodiment the wall 54 portion of the connector is composed of a light transmissive material such as PVC, polycarbonate or other relatively hard, durable polymeric material having the appropriate physical properties for maintaining clarity and light transmissiveity, and heat dissipation. In this alternative embodiment, bore 64 opens into cavity/chamber 58 or 72 and extends into wall 54 toward cavity/chamber 48. However, in this embodiment bore 64 does not penetrate entirely through wall 54 and hence does not open into cavity/chamber 48. Rather, the thickness of wall 54 is selected to accommodate a bore which will in turn accommodate an LED light source, yet without completely penetrating the wall 54. That portion of the wall 54 remaining at the closed end of bore 64 forms a light transmissive window between chamber 48 and bore 64. The window functions to further isolate bore 64, cavity 58 or 72, and their contents from moisture, debris and other environmental conditions which may be present in cavity 48. It will be understood by those of ordinary skill in the art, that the present embodiment may be fabricated from a single of material or fabricated from two or more pieces of materials whose physical properties may differ. For example, wall 54 may be composed of a light transmissive material while the remainder of the connector may be fabricated of other polymeric materials or of metal. Where the connector 27 is fabricated in two or more pieces, some or all of the pieces may be joined by adhesive bonding or other conventional means to provide adequate mechanical strength and to assure a watertight seal between cavity 48 and bore 64.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention.

What is claimed is:

1. A fiber optic connector comprising:

a cylindrical tube having a first end and an opposite second end;

a first cavity extending from the first end toward the second end of said tube;

said first cavity defining a first interior surface of the tube;

a first channel extending circumferentially formed in said first interior surface adapted to receive an O-ring;

a second cavity extending from the second end toward the first end of said tube;

said second cavity defining a second interior surface of the tube;

a wall between said first cavity and said second cavity;

a bore opening into said first cavity and opening into said second cavity extending through the wall; and an LED light source disposed in said bore proximate to said first cavity.

2. The fiber optic connector of claim 1 wherein:

the first cavity is sized to receive any of a fiber optical conduit, a fiber optical conduit bundle or a solid light guide.

3. The fiber optic connector of claim 1 wherein:

the first cavity is sized to receive any of a fiber optical conduit, a fiber optical conduit bundle or a solid light guide; and a second channel extending circumferentially formed in said first interior surface adapted to receive an O-ring.

4. The fiber optic connector of claim 1 wherein:

a fiber optic is disposed in said first cavity; and said LED light source is adapted to operatively connect to an electrical power supply.

5. A fiber optic LED light connector comprising:

a cylindrical tube having a first end surface and an opposite second end surface;

a first cavity extending from the first end surface toward the second end surface;

said first cavity adapted to receive a fiber optic;

a second cavity extending from the second end surface toward the first end surface;

a wall formed in said tube between said first cavity and said second cavity;

a bore opening into said first cavity and opening into said second cavity extending through said wall;

said bore adapted to receive an LED light source;

an LED light source disposed in said bore proximate the opening into said first cavity; and means for operatively connecting said LED light source to an electrical power supply.

6. The fiber optic LED light connector of claim 5 wherein:

a fiber optic is disposed in said first cavity positioned adjacent the LED light source.

7. A fiber optic LED light connector comprising:

a cylindrical tube having a first end and an opposite second end;

a first cavity extending from the first end toward the second end;

said first cavity having a diameter defining a first interior surface of the tube;

said first cavity adapted to receive a fiber optic;

a channel extending circumferentially formed in said first interior surface;

said circumferential channel having an outer diameter greater than the diameter of said first cavity;

said circumferential channel adapted to receive an O-ring having an outer diameter defining an outer diameter circumference and an inner diameter defining an inner diameter circumference;

said O-ring disposed in said circumferential channel in sealing contact circumferentially around its outer diameter circumference with said circumferential channel and adapted to form a sealing contact circumferentially around its inner diameter circumference with a fiber optic;

a bore opening into said first cavity; and an LED light source disposed in said bore proximate to said first cavity.

8. A fiber optic LED light connector comprising:

a cylindrical tube having a first end and an opposite second end;

a first cavity extending from the first end toward the second end;

said first cavity having a diameter defining a first interior surface of the tube;

said first cavity adapted to receive a fiber optic;

a channel extending circumferentially formed in said first interior surface;

said circumferential channel having an outer diameter greater than the diameter of said first cavity;

said circumferential channel adapted to receive an O-ring having an outer diameter defining an outer diameter circumference and an inner diameter defining an inner diameter circumference;

said O-ring disposed in said circumferential channel in sealing contact circumferentially around its outer diameter circumference with said circumferential channel and adapted to form a sealing contact circumferentially around its inner diameter circumference with a fiber optic;

a second cavity extending from the second end toward the first end;

a wall formed in said connector between said first cavity and said second cavity;

a bore opening into said first cavity and into said second cavity extending through said wall;

said bore adapted to receive an LED light source;

an LED light source disposed in said bore proximate the opening into said first cavity; and means for operatively connecting said LED light source to an electrical power supply.

9. The fiber optic LED light connector of claim 8 wherein:

a fiber optic is disposed in said first cavity positioned adjacent the LED light source.

10. A fiber optic LED light connector comprising:

a cylindrical tube having a first end and an opposite second end;

a first cavity extending from the first end toward the second end;

said first cavity adapted to receive a fiber optic;

a second cavity extending from the second end toward the first end;

a wall formed in said tube between said first cavity and said second cavity;

a bore opening into said first cavity and into said second cavity extending through said wall;

said bore adapted to receive an LED light source;

an LED light source disposed in said bore proximate to the opening into said first cavity; and said LED light source is adapted to operatively connect to an electrical power supply.

11. A fiber optic LED light connector comprising:

a cylindrical tube having a first end surface and an opposite second end surface;

a first cavity extending from the first end surface toward the second end surface;

said first cavity defining a first interior surface of said tube adapted to receive a fiber optic;

a second cavity extending from the second end surface toward the first end surface;

said second cavity defining a second interior surface of said tube;

a wall of light transmissive material positioned in said tube between said first interior surface and said second interior surface;

a bore opening into said second cavity and extending substantially through said wall toward said first cavity;

a window having a first side formed by said first interior surface and having a second side formed by the interior surface of the bore at the closed end of said bore;

said bore adapted to receive an LED light source;

an LED light source disposed in said bore proximate to said window;

means for operatively connecting said LED light source to an electrical power supply.

12. The fiber optic LED light connector of claim 11 wherein:

a fiber optic is disposed in said first cavity closely adjacent to said window.

13. A fiber optic LED light connector comprising:

a cylindrical tube having a first end and an opposite second end;

a first cavity having a first opening and extending from the first end toward the second end;

said first cavity having a first interior surface defining a truncated conical volume;

said first cavity adapted to receive a fiber optic through the first opening;

a second cavity having a second opening extending from the second end toward the first end;

said second cavity defining a second interior surface of said tube;

a wall between said first cavity and said second cavity;

a bore opening into said first cavity and opening into said second cavity extending through said wall;

said bore adapted to receive an LED light source;

an LED light source disposed in said bore proximate to said first cavity;

means for operatively connecting said LED light source to an electrical power supply.

14. The fiber optic LED light connector of claim 13 wherein:

helical threads are formed in said first interior surface.

15. The fiber optic LED light connector of claim 13 wherein:

helical threads are formed in said first interior surface;

any of a fiber optical conduit, a fiber optical conduit bundle or a solid light guide are retained in said first cavity adjacent the LED light source by means of said helical threads.

16. A fiber optic LED light connector comprising:

a cylindrical tube having a longitudinal axis and having a first end and an opposite second end;

said first end having a first opening and said second end having a second opening;

a first cavity extending along said longitudinal axis from the first opening toward the second end;

said first cavity having an essentially circular cross-section orthogonal to the longitudinal axis forming a first interior surface;

said essentially circular cross-section having a diameter which varies along the longitudinal axis;

said essentially circular cross-section having a greatest diameter at said first opening;

said first cavity adapted to receive a fiber optic;

a second cavity extending along said longitudinal axis from the second opening toward the first end;

said second cavity defining a second interior surface of said tube;

a wall between said first cavity and said second cavity;

a bore extending through said wall and opening into said first cavity to form a third opening and opening into said second cavity to form a fourth opening;

said bore adapted to receive an LED light source;

an LED light source disposed in said bore proximate to said third opening;

means for operatively connecting said LED light source to an electrical power supply.

17. The fiber optic connector of any one of claim 1, 11, 13 or 16 wherein:

the first cavity, the second cavity and said bore are co-axial.

18. The fiber optic connector of any one of claim 1, 11, 13 or 16 wherein:

said connector is formed of a single piece of material.

19. The fiber optic LED light connector of claim 16 wherein:

the diameter of said essentially circular cross-section decreases uniformly along said longitudinal axis from said first opening toward said second end.

20. The fiber optic LED light connector of claim 16 wherein:

helical threads are formed in said first interior surface; and the axis of the helix is parallel with said longitudinal axis.

21. The fiber optic LED light connector of claim 16 wherein:

any of a fiber optical conduit, a fiber optical conduit bundle or a solid light guide are disposed in said first cavity positioned adjacent the LED light source.

22. The fiber optic LED light connector of claim 16 wherein:

helical threads are formed in said first interior surface;

any of a fiber optical conduit, a fiber optical conduit bundle or a solid light guide are retained in said first cavity adjacent the LED light source by means of said helical threads.

* * * * *